United States Patent [19]

Kay

[11] 4,345,680

[45] Aug. 24, 1982

[54] MATERIAL TRANSFER APPARATUS

[76] Inventor: Franklin J. Kay, 2103 Place Rebecca D-3, Houston, Tex. 77068

[21] Appl. No.: 180,433

[22] Filed: Aug. 22, 1980

Related U.S. Application Data

[63] Continuation of Ser. No. 912,198, Jun. 5, 1978, abandoned.

[51] Int. Cl.³ .............................................. B65G 41/00
[52] U.S. Cl. .................................... 198/304; 198/302; 198/311; 198/313; 198/317
[58] Field of Search ............... 198/302, 304, 311, 315, 198/316, 317, 318, 508, 540, 547, 550, 557, 562, 616, 860, 861, 864, 865, 836, 313; 299/18

[56] References Cited

U.S. PATENT DOCUMENTS

| | | | |
|---|---|---|---|
| 1,374,728 | 4/1921 | Geier | 198/311 |
| 1,382,557 | 6/1921 | Schpatz | 198/317 |
| 1,732,083 | 10/1929 | Coppock | 198/317 |
| 1,821,881 | 9/1931 | Coppock | 198/311 |
| 1,833,192 | 11/1931 | Waterman | 198/311 |
| 2,356,434 | 8/1944 | Russell | 198/861 |
| 2,642,984 | 6/1953 | Mercier | 198/301 |
| 2,718,296 | 9/1955 | Johnson | 198/311 |
| 3,365,050 | 1/1968 | Taylor | 198/311 |
| 3,825,107 | 7/1974 | Cary et al. | 198/316 |
| 4,133,581 | 1/1979 | Satterwhite | 299/18 |

OTHER PUBLICATIONS

"Development of a Cross-Pit Conveyor System", Phase 11 Report, vol. I, Foster-Miller Assoc.
Kolman Sales Manual Showing Models 101R, 101XHD, 101RFP.
Page A81 from Eickhoff Sales Brochure.

Primary Examiner—Joseph E. Valenza
Attorney, Agent, or Firm—Bell, Seltzer, Park & Gibson

[57] ABSTRACT

A mobile material transfer apparatus having a conveyor mounted on a vertically pivotal boom and a pivoting depository including pivotal side hoppers for depositing material into a center hopper and from the center hopper onto the belt, the whole apparatus being pivotally mounted on a self propulsion unit and pivotal about an axis generally through the vertical centerline of the propulsion unit; and methods of using such a device for more efficient strip mining are disclosed.

22 Claims, 13 Drawing Figures

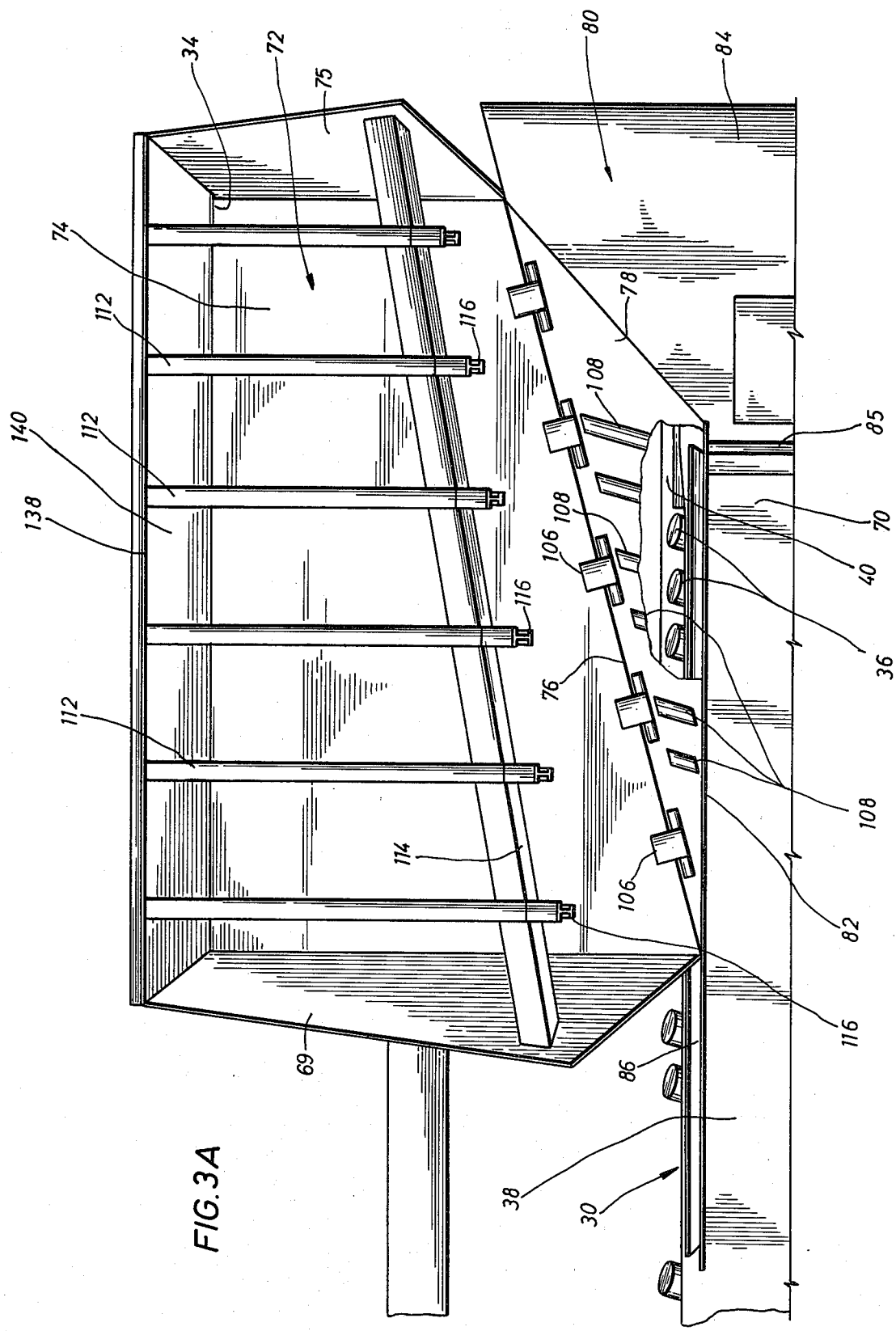

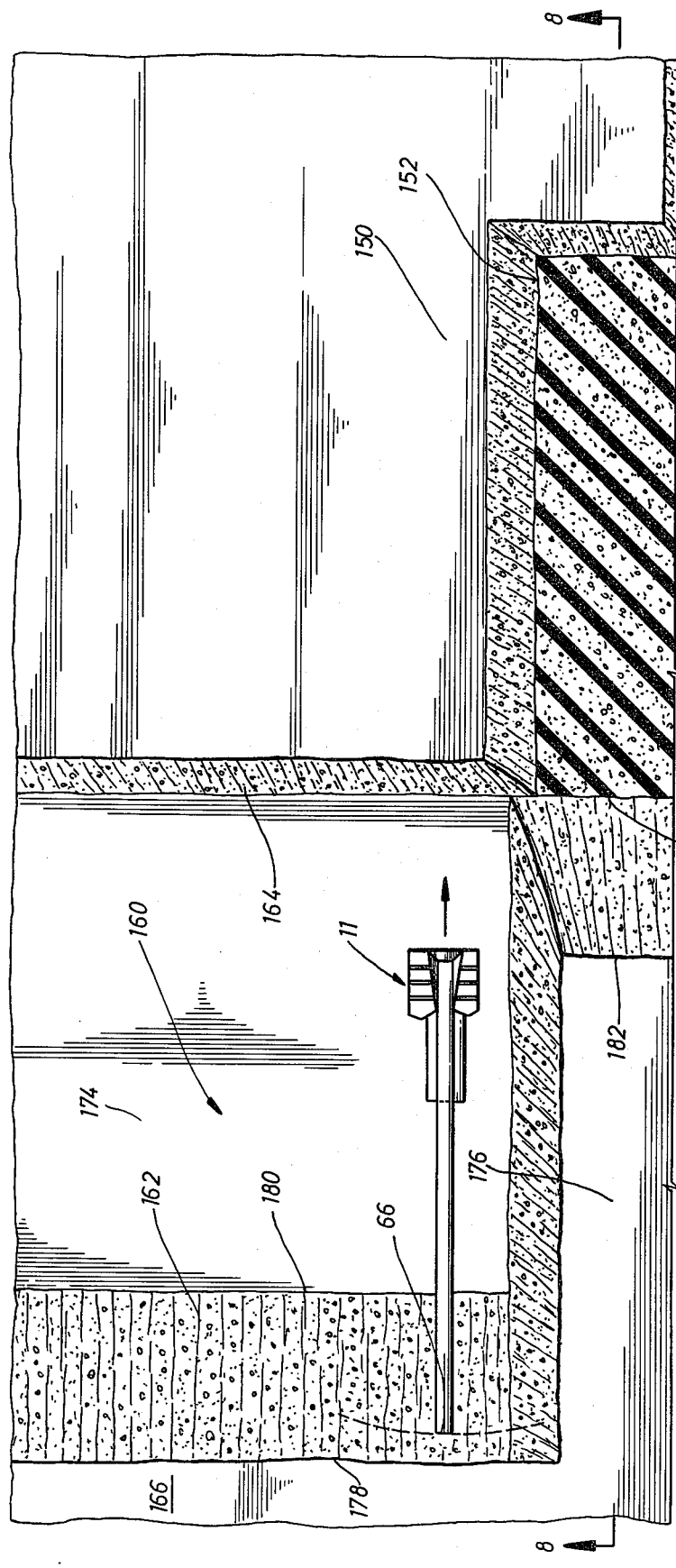
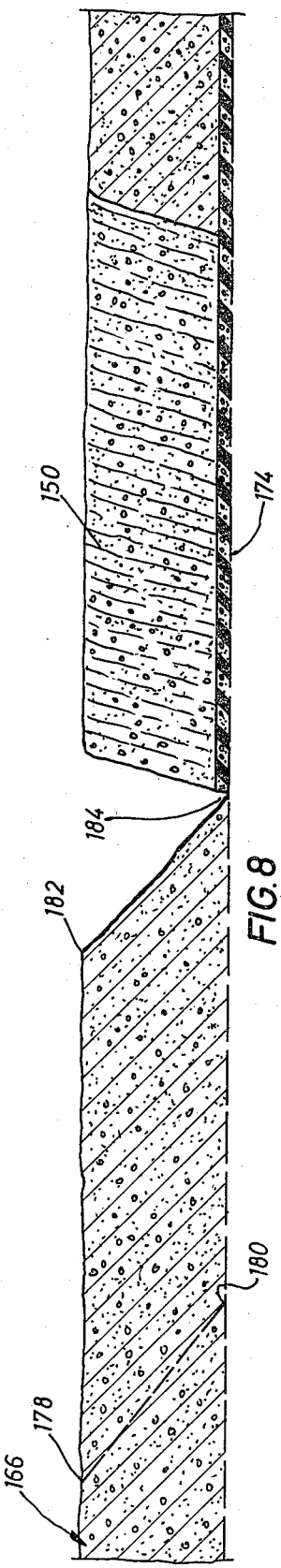

MATERIAL TRANSFER APPARATUS

This is a continuation of application Ser. No. 912,198, filed June 5, 1978 now abandoned.

BACKGROUND OF THE INVENTION

1. Field of the Invention

The present invention relates to a method and apparatus for the handling of overburden removed from the top of a seam of mineable mineral, e.g., coal located near the surface of the earth during strip mining operations.

2. Description of the Prior Art

Mining of minerals, e.g., coal, in the United States and foreign countries takes a number of forms, including strip mining. Strip mining is a process whereby a seam of mineable minerals close to the surface of the earth is removed by first stripping away the unwanted earthen materials, i.e., dirt, called the overburden, from above the seam and then mining the desired minerals contained in the seam.

This removal of the overburden often requires the removal and relocation of massive amounts of earthen dirt from above the mineral seam. The methods and apparatus for doing this removal and relocation determine the economic feasibility of strip mining the mineral seam, because it is only economical to remove so much dirt in so much time to uncover a mineral seam containing a given quantity of desired mineral. The costs in terms of labor, capital investment in equipment, lease costs and energy consumed must be decreased to a minimum in order to fully exploit seams of mineable minerals close to the earth's surface. The cheaper it is to remove the overburden from the mineral seam per unit volume of overburden, the deeper the mean depth of a seam can be from the surface while maintaining the same profit margin. Therefore, the resources available through strip mining can be increased by decreasing overburden removal expenses.

Typically in a strip mining operation the overburden is removed from a generally rectangular area above a seam, e.g., a coal seam. The coal is then removed leaving a hole in the ground, referred to in the art as a pit. The pit can be of varying dimensions and will have walls of varying heights depending on the topography and the depth of the seam below the earth's surface at the place the pit is formed. In the prior art it was most desirable for a strip mining operator to form the first pit where the overburden depth was a minimum in order to be able to commence actual production of the coal seam with a minimum overburden removal time. This allowed the prompt generation of income to sustain further operation of the strip mine. Therefore, prior art strip mines typically contained a first pit having front and back walls running along a topographical line of generally the least amount of overburden cover.

In the art of strip mining it is the usual procedure to remove overburden from an area adjacent to the first pit and place this removed overburden in the first pit, thus forming a second pit having a front wall of unremoved overburden and a back wall of the removed overburden which was deposited in the first pit. This removed overburden placed in the previously mined pit is called a spoil pile.

Two problems exist in the prior art. Both of these are related to the increasing scrutiny of federal and state governments of the condition in which strip mining operators leave the land after the mining is completed.

Because of the necessity to start a first pit along a line where the overburden is thinnest, the second pit will be deeper than the first. This assumes the coal seam runs generally horizontally in the area being mined and the topography of the land in the area being mined is not perfectly flat. The next pit after the second pit, the overburden from which is placed in the second pit, and succeeding pits will continue to increase in depth until the pits are advanced across the area being mined as far as possible or desirable. When this is done the last and deepest pit is left unfilled. Previous practice was to leave this unfilled or partially filled, marring the landscape. Federal and state regulations concerning regrading of strip mines now require refilling of this last pit to reconform the whole mined area to the general topography existing before the mining occurred.

A second and related problem stems from the prior art methods of transporting and depositing the overburden on the spoil pile being extended across the previously mined pit. Typically the spoil pile was formed of a plurality of discrete piles. The terrain in the whole mined area after strip mining, using prior art methods, thus contained numerous peaks which had to be leveled at great expense in time, labor and energy use, in order to regrade the whole mined area to meet regulatory requirements.

Thus, an apparatus and method was found to be needed which would enable fast and efficient removal of overburden with the pits being formed substantially perpendicular to the topographical line of minimum overburden depth. This would substantially reduce the first problem, since the final pit would not be the great hole resulting where the final pit runs generally along the topographical line of maximum depth of overburden removed from above the coal. Rather the final pit would vary in depth, having a shallow end and a deep end and would thus require less dirt to be relocated to fill it.

It was also found that a quicker and more efficient apparatus and method were needed to transport and deposit the overburden onto the spoil pile while at the same time being capable of substantially evenly distributing this dirt so that regrading would be substantially unnecessary.

Prior art conveyor apparatus are shown in the patents to Mercier, U.S. Pat. No. 2,642,984, Waterman, Jr., U.S. Pat. No. 1,833,192, and Coppock, U.S. Pat. No. 1,821,881. These fail to meet the needs of the strip mining problems noted above because they lack full articulation in three dimensions.

Prior art methods of removing the overburden from the coal layer and depositing it on the continuation of the spoil pile include shovel and drag line operations. The shovels and drag lines are necessarily of extremely large size, running upward to 70 tons. The booms on these machines must be of great length in order to be able to transport the overburden from where it is being removed to the spoil pile without the necessity of moving the base of the shovel or drag line. Such an operation is necessarily slow and consumes a great deal of energy required to lift the drag line or shovel high enough to dump the material on top of the extension of the spoil pile and to swing the boom from the overburden bank to the spoil pile and back. In such operations, also, the spoil pile is built up in a haphazard manner forming a series of peaks which require further grading after the mining operation is completed in order to level off the area in compliance with numerous federal and state regulations governing strip mining operations.

Further prior art methods of transporting the overburden to the spoil pile require the use of shovels or drag lines, or smaller excavation and lifting devices, such as 5 to 15 cubic yard loaders, scrapers, or excavator loaders. Each of these can be used to lift the overburden into hoppers on the backs of large wheeled or tracked vehicles. These vehicles are driven onto the spoil pile, where the overburden is dumped from the hoppers onto the spoil pile.

It has been found that prior art methods of and apparatus for transporting overburden from the overburden bank to the spoil pile are slow and consume a great deal of energy, and suffer from the infirmity noted above of distributing of the overburden on the spoil pile in a haphazard and nonuniform manner.

Economic feasibility in removing the overburden can be measured in the form of a stripping ratio of overburden to mined material. For example, a ratio of 14 cubic ft. of overburden to 1 cubic ft. of coal may be the acceptable number in some geographic regions. Present methods of overburden transfer limit production and increase costs to the point of reducing the mineable reserves of coal produceable by strip mining in the United States to thick seams or shallow overburden.

Methods of strip mining of coal vary throughout the country, depending on many variables such as overburden materials and depth, the lay of the coal seam, thickness of the coal seam, depth of the coal seam, and both financial and functional operational choices.

In each of the above cases total production time, including overburden stripping, is limited by materials, transport time, availability of the machines, interdependence of the machines, and reliability. A significant portion of the cycle time in removing overburden is used in transferring the removed overburden from the overburden bank to the spoil pile. Any reduction in this time has been found to result in a direct increase in productivity. As already noted, draglines and stripping shovels have historically left spoils in a configuration that requires extensive and expensive reworking, such as, refilling and grading. Thus, for example, typical dragline and stripping shovel spoil piles could contain approximately 9680 loose cubic yards (1 cy) per acre of material which must be moved at a cost of approximately $1000.00 per acre in order to regrade the mined area. This cost and material handling is in addition to that required for removing the overburden to mine the coal.

A further consideration is the energy expended in the prior art types of apparatus and methods of removing and transporting the overburden. Shovels and draglines expend a large part of their total energy in lifting the overburden load to the height of the spoil pile and swinging the load over to the spoil pile then swinging back to the overburden removal site. Loaders expend considerable energy in transiting between the overburden removal site and the top of the spoil pile.

SUMMARY OF THE INVENTION

There is a definite need in the art for a mobile conveyor device to improve the efficiency and economy over the prior art methods of transferring the overburden to the spoil pile area. The apparatus of the present invention has the capability of evenly distributing the overburden removed from the mining area on the spoil pile with a substantially uniform and selected depth throughout.

The apparatus of the invention has the ability of being selfpropelled by a selfcontained propulsion device. The apparatus of the present invention has a conveyor which is pivotal about a fixed vertical axis substantially through the center of the propulsion unit and is pivotal about a horizontal axis to raise and lower the discharge end of conveyor. Thus the apparatus of the present invention is fully articulatable in three dimensions and, therefore is capable of selective even distribution of the overburden on the spoil pile such that the spoil pile generated has substantially a selected height throughout.

With the apparatus and method of the present invention, material is continuously conveyed by means of an endless conveyor belt, using a significantly reduced amount of energy. The method of the present invention provides a much more efficient way to transfer material.

In addition, the apparatus, in order to be compatable with the smaller and more economical excavating devices, such as excavators or front-end loaders with bucket sizes of from about 5 to about 10 cubic yards, preferably has a depository into which these smaller excavating devices are capable of dumping. This enables the use of such smaller loading devices, which consume much less energy in depositing the overburden into this depository. In contrast, in the conventional mode of using these front-end loaders, they not only excavate the overburden but transport it to the spoil pile for dumping.

The speed and mobility of these small loaders in conjunction with the apparatus and method of the present invention greatly increase the overburden removal rate with a decrease in energy use. Since transporting of the material is accomplished by the apparatus of the present invention, the loaders can cycle (between the point of picking up the overburden and the point of discharging the material into the depository of the present invention) several times as fast as the conventional mode and a resultant decrease in overburden removal time occurs. This system according to the present invention can decrease production costs by as much as 80% and increase productivity by as much as 240%.

It is, therefore, a general object of the present invention to provide a novel method and apparatus which minimizes or reduces the problems of the type previously noted.

It is a more particular object of the present invention to provide a mobile conveyor which is pivotal in the vertical axis about a fixed point while at the same time being capable of lateral movement and which has a conveyor, the upper end of which is capable of being elevated or lowered about a fixed horizontal pivot, thus providing for the maximum versatility in depositing the overburden on the spoil pile.

Yet another object of the present invention is to provide an improved method for strip mining operations.

Still another object of the present invention is to decrease the amount of time necessary for strip mining operations in terms of the amount of time needed to transfer the overburden from the top of the coal layer to the spoil pile and in terms of the amount of time necessary to grade or level off the spoil pile area in order to comply with applicable federal regulations.

Yet still another object of the present invention is to decrease the amount of energy consumed in those portions of a strip mining operation involving the transfer of the overburden to the spoil pile area and the subsequent grading of the spoil pile area.

A further object of the present invention is to provide a single machine having the capability of being easily moved from point-to-point in the area where the overburden is being removed, and once at a given point having the capacity to distribute the overburden onto the spoil pile area with a conveyor having great flexibility of movement in the horizontal and vertical planes and having an improved depository to facilitate the use of the present apparatus and method with front-end loaders.

An apparatus and method according to the presently preferred embodiment of the invention to substantially accomplish the foregoing objects includes a mobile overburden load transfer system including an undercarriage with a tracked propulsion unit, a frame pivotally mounted on the undercarriage and rotatable about substantially the vertical center axis of the undercarriage, a conveyor, such as a continuous belt conveyor mounted on a boom, which boom is pivotally attached to the frame at one end of the boom, means for raising and lowering the other end of the boom by pivoting it about its pivot point, and a pivoted depository disposed on the frame for distributing overburden material loaded into the depository onto the conveyor and constructed to facilitate dumping of overburden into the depository by a front-end loader with a bucket capacity on the order of about five to ten cubic yards.

The apparatus and method of the present invention in conjunction with prior art loaders reduces labor costs and machine time in removing and relocating overburden. A projected typical cost saving is 15 cents/BCY, which, on a production of approximately 7 million BCY (bank cubic yards) per year is more than $1 million per year. Another way to compare the apparatus and method of the present invention with the prior art is that the mining technique and apparatus of the present invention gives an output greater than 3 sets of equipment in the equivalent loader-loader operations of the prior art, while utilizing only one-third the labor force and less than one-half the fuel. This is quite a benefit at a time when qualified operators are so hard to find and energy costs are so high.

It has also been found that extension of the life of the conveyor can be achieved by placing vanes in a portion of the depository which direct the flow of the overburden discharged into the depository in the same direction as the movement of the conveyor, thus decreasing the wear upon the conveyor by the impact of the overburden onto the conveyor. In addition, to protect the conveyor belt a two stage depository is preferably employed in the present invention. Two side hoppers receive overburden from the excavating devices employed and distribute it into a third hopper, which deposits it onto the conveyor belt. Through the action of the vanes, this depositing occurs with the overburden being directed in the direction of conveyor belt motion prior to striking the belt.

Examples of the more important features of this invention have been summarized rather broadly in order that the detailed description thereof that follows may be better understood, and in order that the contribution to the art may be better appreciated. There are, of course, additional features of the invention that will be described hereafter and which will also form the subject of the claims appended hereto.

The above-referenced objects, features and advantages of the present invention will become apparent with reference to the following detailed description of a preferred embodiments thereof. In connection with the accompanying drawings, wherein like reference numerals have been applied to like elements, in which:

BRIEF DESCRIPTION OF THE DRAWINGS

FIG. 3A is an enlarged partially cut away view of a portion of FIG. 3 showing one half of the pivoted depository;

FIG. 7 is a plan view in more detail of a method of mining according to the present invention;

FIG. 8 is a sectional view along section lines 8—8 in FIG. 7; and

DETAILED DESCRIPTION OF PREFERRED EMBODIMENTS

In order to decrease the cost of moving materials to the spoil pile and reworking the spoil pile, the preferred embodiment of the present invention provides economy, through decreased production time and cost, in the method and apparatus to remove and transport the overburden. An ideal solution would be a continuous operation, that is, one where the overburden removal mechanism would be used for only overburden removal and the transfer mechanism would only transfer material to the spoil pile. A conveyor continuously fed by a continuous loading mechanism is the most optimum answer. However, a suitable mobile conveyor has not, prior to the present invention, been available.

Prior to the present invention, no practical machine had been developed that could be used in the shallow overburden stripping operations that comprise a significant percent of current strip mining coal production in the United States.

A materials handling concept that completely eliminates the transit time to the spoil pile for wheeled loaders and the swing time to the spoil pile for draglines and shovels forms a preferred embodiment of the present invention.

A presently preferred embodiment is a materials handling system capable of use with loaders, such as, front-end loaders, in the capacity range of approximately five to ten cubic yards. The system of the preferred embodiment of the present invention is a Mobile Overburden Loader Transfer System (MOLTS). It is however not restricted to use with front-end loaders and provides a means of increasing the output and decreasing the energy consumption of any overburden removal system using machinery capable of depositing the overburden in the hopper of the present invention.

The overburden conveyor system of the present invention has many advantages for strip mining operations. Increased production with a decrease in the capital cost required to increase production; decreased operational costs and manpower; and increased operational reliability and availability all result from utilization of the apparatus and method according to the present invention.

Figure 1:
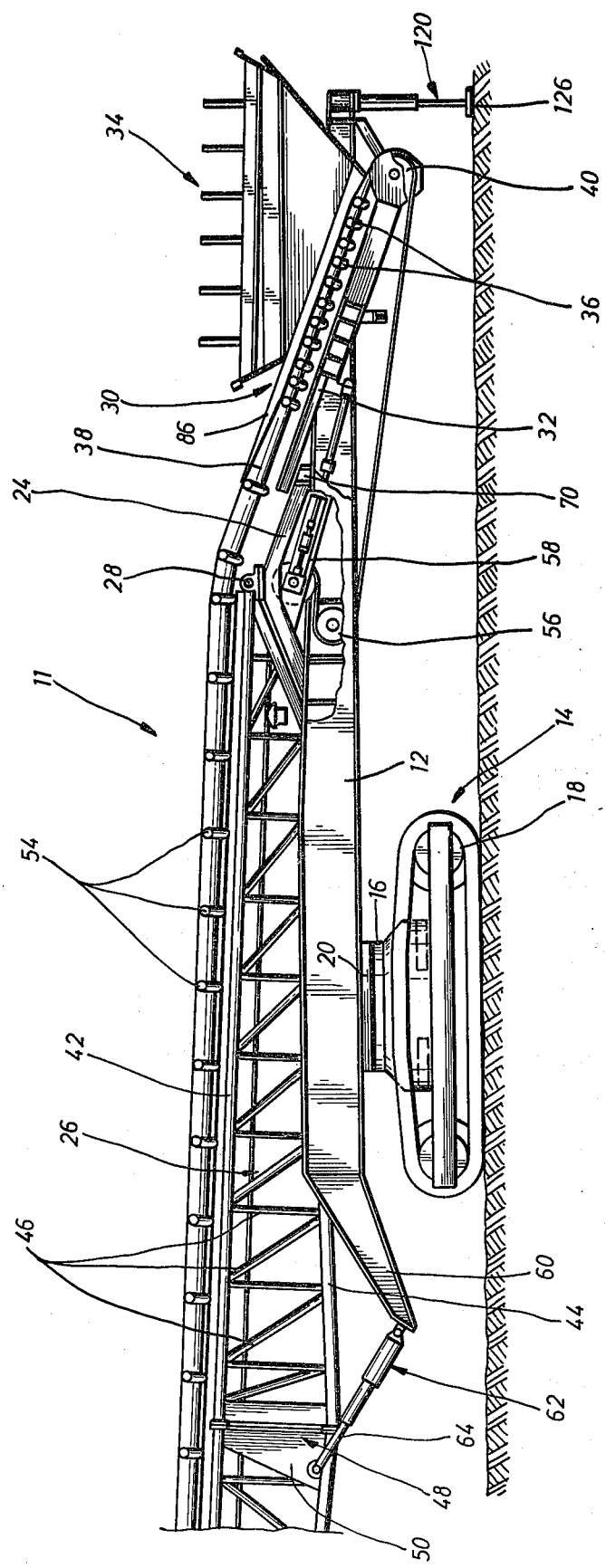
FIG. 1 shows a partially cut-away side view of the mobile overburden transfer system apparatus according to a preferred embodiment of the present invention.
Figure 2:
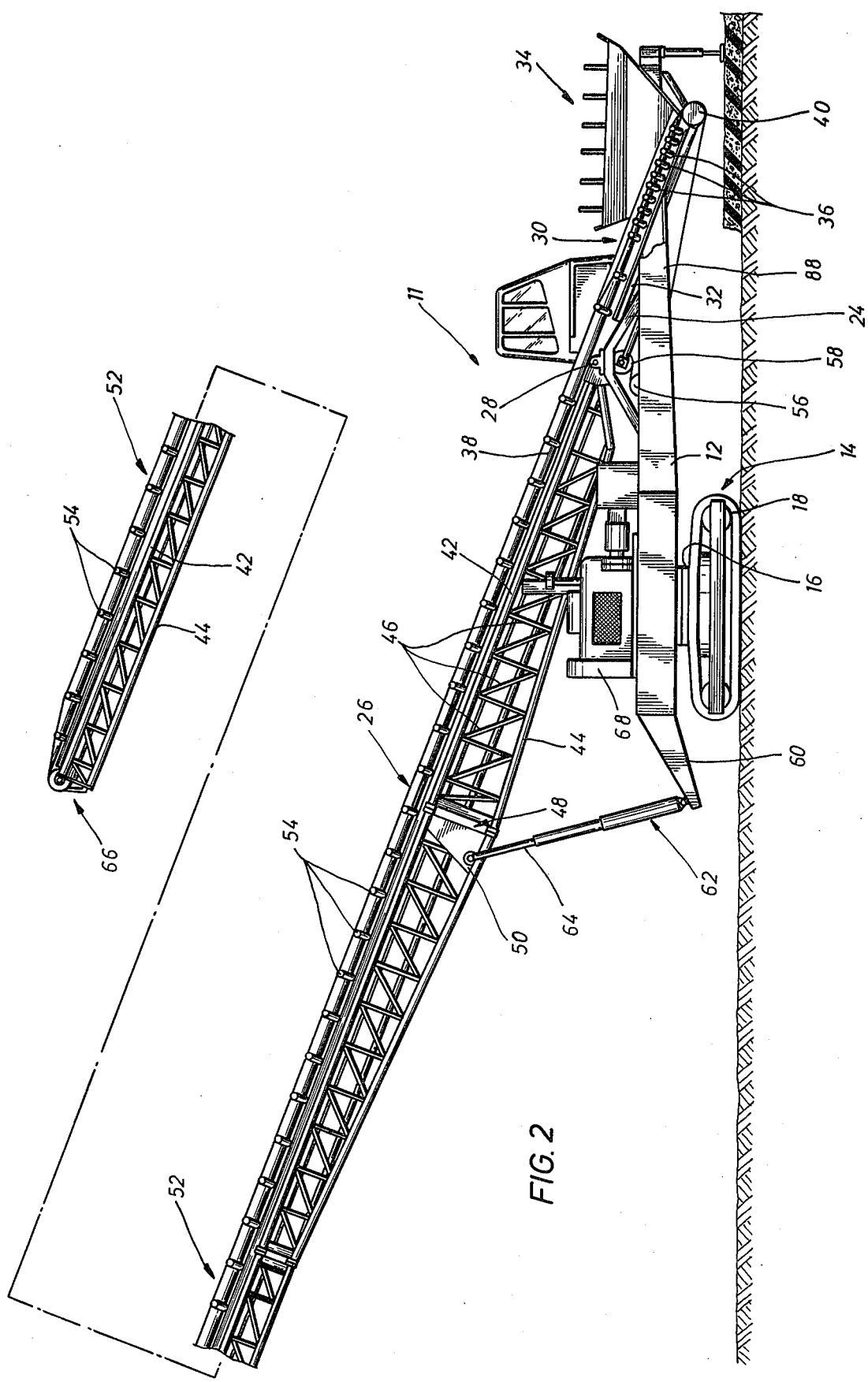
FIG. 2 is also a partially cut-away side view of the mobile overburden transfer system apparatus of the present invention with the conveyor boom shown in an elevated position.

Turning first to FIGS. 1 and 2 it can be seen that a mobile conveyor 11 according to a presently preferred embodiment of the present invention includes a frame 12 which is mounted upon a lower support means, for example, a tracked propulsion device 14 such as that made by "CATERPILLAR" and used for propulsion drive means for its backhoe excavators models 225, 235, or 245. The propulsion unit 14 has a car body 16 attached to tracked drive units 18. The lower support means, for example, propulsion device 14, provides the support for the mobile conveyor 11 and, therefore, defines an area within which the center of gravity of mobile conveyor 11 resides for maintaining the stability of the apparatus when in operation. Integrally mounted on the car body 16 is an internal swing drive ring gear (not shown) which, together with a swing drive pinion 22 attached to the frame 12, operates to swing the frame 12 about a vertical axis through the centerline of the ring gear and substantially through the vertical center axis of the tracked propulsion mechanism 14.

The swing drive ring gear and pinion 22 can be any suitable type of swing drive mounting well known in the art, e.g., a "ROTEK" type bearing used on a "CATERPILLAR" Model 245 excavator, wherein the ring gear is integrally attached to the car body 16 which also contains the inner race for a "ROTEK" type bearing (not shown). The outer race of the bearing and the swing drive pinion 22 are attached to frame 12 by any suitable means. Thus when swing drive pinion 22 is rotated and its gears engage the gears of the ring gear on the car body 16, the inner race and outer race of the "ROTEK" bearing rotate with respect to each other and the frame 12 thus pivots with respect to the propulsion unit 18.

As can be seen from FIGS. 1 and 2, in a preferred embodiment of the present invention the frame 12 is pivotally mounted on the tracked propulsion mechanism 14 at substantially one end of the frame 12. A boom pivot bracket 24 is mounted on the frame 12. A boom 26 is pivotally mounted on the bracket at one end 28 of the boom 26.

Another portion of the conveyor is a relatively fixed portion, i.e., non-pivotable, and mounted on a fixed frame 32 that extends under a pivoted hopper or depository 34 and contains impact idlers 36 over which a conveyor belt 38 runs, which impact idlers 36 serve to absorb impact from the overburden dropping onto the conveyor belt 38 in order to prolong conveyor belt 38 life. The impact idlers 36 may preferably be troughed in order to form a pocket-like depression in the conveyor belt 38 to increase the capacity of the conveyor belt 38.

A suitable trough could be, e.g., about a 20° trough. Also, this portion 30 of the conveyor 30 contains a conveyor end pulley 40.

The boom 26 consists of a pair of upper boom rods 42 and a pair of lower boom rods 44 which are connected by a lattice work structure 46 to form the frame of the boom 26. In a preferred embodiment, the lower boom rods 44 may be displaced at a slightly increasing distance from the upper boom rods 42, this distance increasing towards roughly the center 48 of the boom 26. At roughly this center 48 a brace plate 50 is attached in the preferred embodiment of the present invention. The boom 26 also has, in a preferred embodiment, an extension 52 wherein the upper boom rods 42 and lower boom rods 44 are generally parallel.

The conveyor boom 26 contains a continuous belt conveyor belt 38. The conveyor belt 38 moves along conveyor rollers or idlers 54 mounted on the boom frame 26 and the boom extension 52, and over the impact idlers 36 on the fixed portion 30 of the conveyor and is driven and kept tight by suitable belt drive 56 and tensioning 58 mechanisms mounted on the frame. As with the impact idlers 36, the conveyor rollers or idlers 54 may suitably be troughed with a preferable trough being of about 35°.

In the preferred embodiment of the present invention, the frame 12 has two structural extensions or feet 60 integrally attached to the same end that the tracked propulsion mechanism 14 is connected to. Hydraulic cylinders 62, each having an extensible arm or rod 64 are pivotally connected at one end to each of the feet 60. In turn each extensible arm or rod 64, in the preferred embodiment, is pivotally connected to one of the brace plates 50. It will be understood that these pivotal connections could be reversed.

The pivotal connection of the arms 64 with the brace plates 50 and of the cylinders 62 with the support structures or feet 60, along with the pivotal connection of the boom frame end 28 to the bracket 24 about which the boom frame 26, 52 pivots, and the extensible nature of the hydraulic piston cylinder arms 64, create a four-bar linkage which allows for better control of the dumping point of the overburden through a higher degree of flexibility and control in the manner in which the discharge end 66 of the conveyor boom 26, 52 is raised and lowered by the action of the hydraulic cylinder arm 64 extending.

Also mounted on the frame is a power plant 68 for providing the motive force for movement of the tracked propulsion mechanism 14, movement of the conveyor belt 38, raising and lowering of the boom 26, 52, and other functions of the apparatus of the present invention, as will later be described. In the preferred embodiment all of these functions are performed by the use of hydraulic power and therefore the power supply device is a typical mechanism for supplying high pressure hydraulic fluid to the various hydraulic motors and pistons involved.

At the end of the frame 12, opposite from that on which the support structures 60 are mounted, the fixed portion 30 of the conveyor belt system is attached to the frame 12 in any suitable fashion, such as by framing 32 and brackets 70. Attached to the fixed part 30 of the conveyor belt system are impact idlers 36 over which the conveyor belt 38 passes while directly under an outlet opening 70 of a portion of the hopper assembly 34. The impact idlers 36 absorb the shock of the material discharging onto the belt 38 and prolong the life of the belt 38. Also attached to the fixed part of the conveyor system is an end pulley 40. For clarity, only the half of the pivoted depository 34, which is on the right side of the frame when looking towards the propulsion unit 14 from the end of the frame 12 to which the pivoted depository 34 is attached, is shown in FIGS. 1 and 2.

Referring now to the details of the pivoted depository 34 in FIG. 3, a right side hopper 72 and a left side hopper 94 each have a floor 74, 96 which abuts an upper edge 76, 98 of, respectively, a right side wall 78 and a left side wall 100 of a center hopper 80 and, as will be explained below, are pivotal about this line of abutment 76, 98. The right side wall 78 and the left side wall 100 of the center hopper extend inwardly and downwardly and each has a lower edge 82, 102 which runs generally parallel to the conveyor belt 38 lying on the impact idlers 36. The center hopper 80 also has a rear wall 84 extending forwardly and downwardly towards the conveyor belt 38 to a line 85 perpendicular to the longitudinal axis of the conveyor 38 and slightly forward of the tail pulley 40. A right skirt 86 and left skirt 104 made of a suitable material, preferably flexible, abuts the lower edges 82, 102 of, respectively, the right side wall 78 and the left side wall 100 of the center hopper 80 and also extends above the sides of the conveyor belt 38. The skirts 86, 104 keep material from spilling over the edges of the conveyor belt 38 when it is deposited from the center hopper 80.

Figure 3:
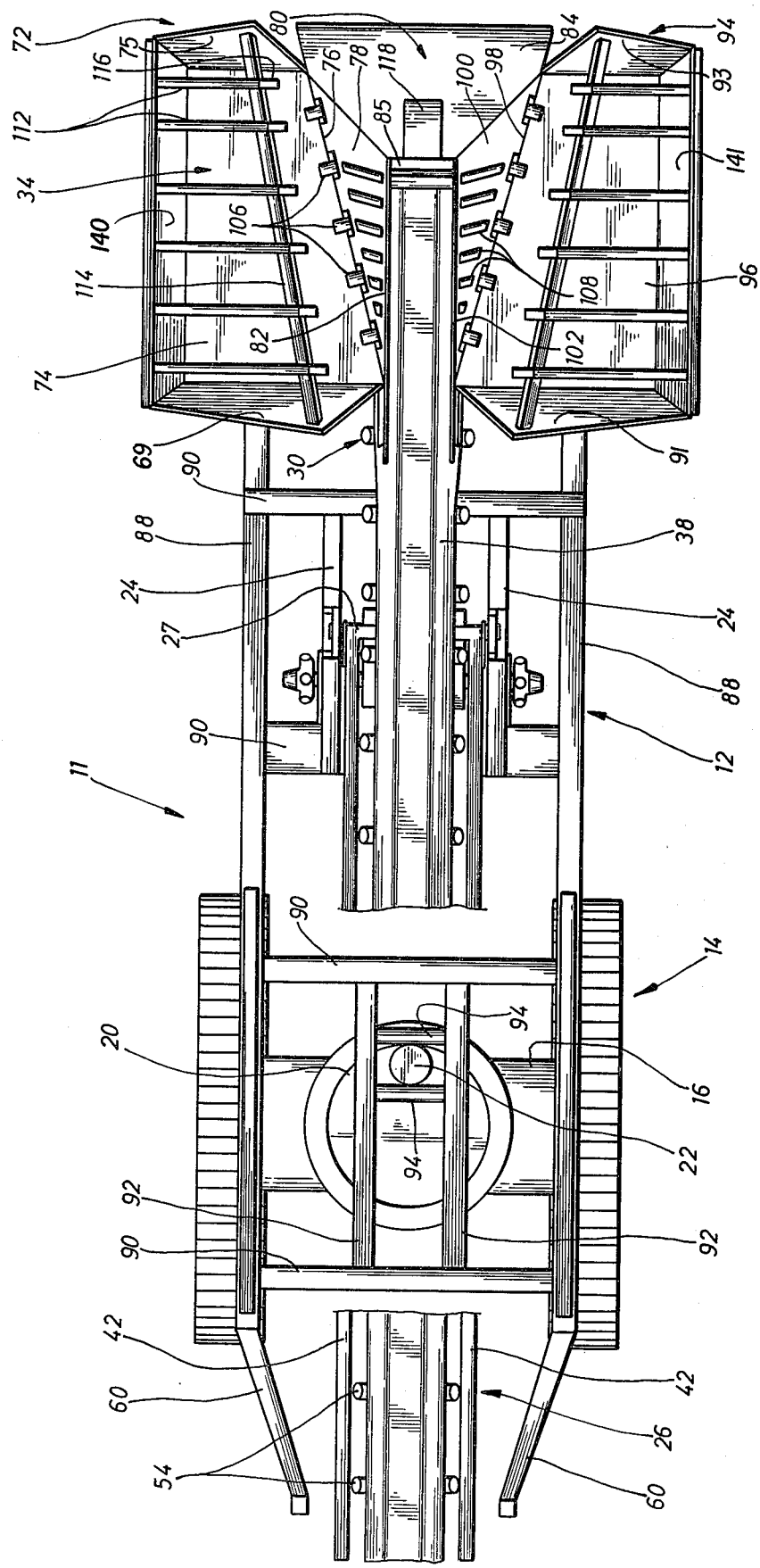
FIG. 3 shows a partially cut-away plan view of the frame of the present invention with the conveyor boom and pivoted depository mounted according to a preferred embodiment of the present invention.

FIG. 3 also shows a plan view of an embodiment of the frame 12 of the present invention. The frame 12 is composed, preferably, of two longitudinal box beams 88 as shown. Tranverse box beams 90 extend between the two longitudinal beams 88 at suitable distances along the length of the longitudinal beams 88. Short longitudinal beams 92 may be suitably located between transverse beams 90 for added support. Support beam 94 extending generally parallel to the transverse beams 90 may be mounted at suitable locations where added support is needed, such as, at the points where the frame 12 is attached to the propulsion device 14, where the boom pivot bracket 24 is mounted (not shown in FIG. 3) and where the pivoted depository 34 is mounted (not shown in FIG. 3). Of course the frame 12 itself forms no significant part of the present invention and merely serves to hold the component parts of the present invention on a platform which is pivotally attached to the propulsion unit 14. Any number of suitable structurally sound frames could be designed by one skilled in the art.

The conveyor boom 26 pivots about an axis through a rear boom bar 27 at the end 28 of the boom 26 which is pivotally attached to the boom bracket 24 and extends forwardly along generally the longitudinal center axis of the frame 12 and above the frame 12. The fixed portion 30 of the conveyor assembly extends rearwardly along the same longitudinal axis as the conveyor boom 26 and slants downwardly through the horizontal plane of the longitudinal box beams 88 of the frame 12 and underlies the pivoted depository 34.

The frame 12 is mounted on, for example, a box section car body 16 as contained in a typical "CATERPILLAR" tracked propulsion unit 14. The frame 12 is attached in the preferred embodiment to a skirt 20 formed by the outer race of the "ROTEK" bearing, which skirt 20 encloses the inner race of the "ROTEK" bearing which is in turn attached fixedly to the car body 16. A hydraulic motor turns the swing gear of the drive pinion 22 which operates to swing the frame 12 about roughly the vertical center axis of the tracked propulsion unit 14.

The pivoted depository 34 has a right side hopper 72 and a left side hopper 94 comprised of, respectively, floors 74, 96, front walls 69, 91, rear walls 75, 93, and outboard or side walls 140, 141. The right and left side hoppers 72, 94 are preferably hingedly connected, respectively, to the right and left side walls 78, 100 of the center hopper 80 by a plurality of hinges 106. The right and left side walls 78, 100 of the center hopper 80 have a plurality of vanes 108 which can be slightly slanted with respect to the perpendicular from the surfaces of the right and left side walls 78, 100, respectively, as shown in FIG. 3, or can protrude generally perpendicular to the surfaces of the side walls 78, 100, respectively. The vanes 108 are also angled with the bottom ends thereof being forward of the top ends thereof in order to direct the material deposited in the center hopper 80 from the side hoppers 72, 94 in the direction in which the conveyor belt 38 moves to convey the material to a distal end 66 of the conveyor boom 26, 52. The rear wall 84 of the center hopper 80 also accomplishes this due to its construction which slants forwardly towards its bottom end.

Figure 4:
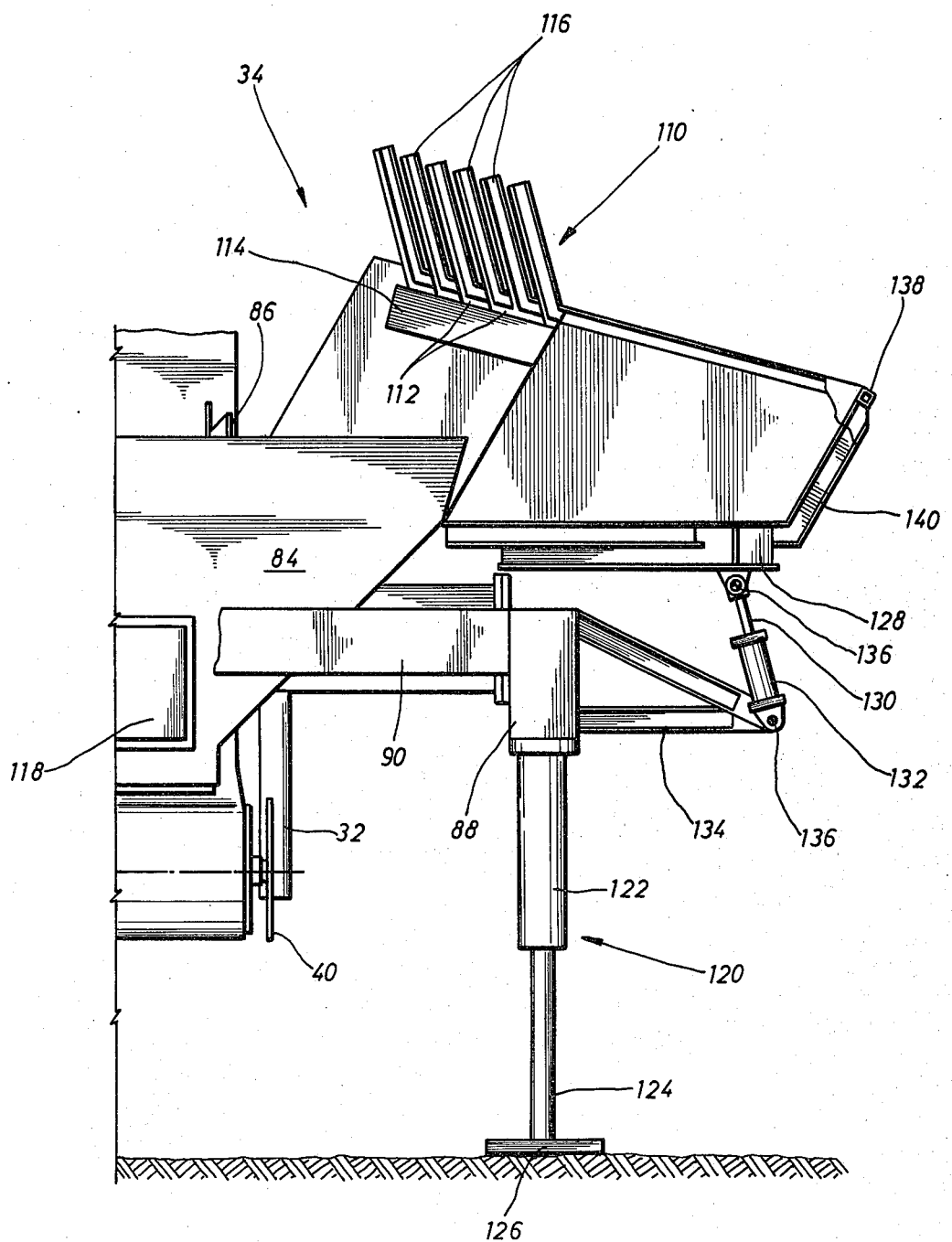
FIG. 4 shows an end view of one half of the mobile overburden load transfer system apparatus according to the present invention from the end upon which the depository is mounted.

FIG. 4 shows a rear end view of the right side of the pivoted depository 34. The left side of the pivoted depository 34 is a mirror image of the right side. Each right and left hopper 72, 94 contains a grizzley bar arrangement 110 consisting of a plurality of grizzley bars 112 over the top of the side hoppers 72, 94 supported by support member 114. These prevent oversized pieces of overburden material from entering the side hoppers 72, 94 and being discharged onto the conveyor belt 38 with the possible affect of damaging the conveyor belt 38. Vertical extensions 116 of the grizzley bars 112 prevent larger pieces of overburden trapped by the grizzley bars 112 from being deposited on the conveyor 38 when the side hoppers 72, 94 are tilted towards the center hopper 80. A plate (not shown) can also be attached to the extensions 116 in order to facilitate the prevention of larger pieces of overburden being dropped onto the conveyor belt 38 when the side hoppers 72, 94 are pivoted.

The rear wall 84 of the center hopper 80 preferably has a door 118 contained therein for removing jammed material from the conveyor 38 by opening the door 118 and reversing the direction of belt 38 movement.

In a preferred embodiment of the present invention, the frame 12 at the pivoted depository 34 end may have mounted on the underside thereof one or more stabilizers 120 which may have a hydraulic cylinder 122 having an extendable arm 124 upon which is mounted a plate 126 for supporting the balancing the apparatus of the present invention when overburden material is placed in the hopper assembly. The plate 126 might also be connected to the arm 124 by a universal joint (not shown).

The plate 126 may also be replaced by a suitable wheeled coaster (not shown) for greater flexibility and the operation of the apparatus of the present invention. When the frame 12 is being pivoted about the tracked propulsion mechanism 14, the wheeled coasters would tend to roll along the surface upon which they are resting, whereas the extensible arm 124 of the stabilizer 120 having a plate 126 at the end of the arm 124 would normally have to be retracted during pivotal motion of the frame 12. This stabilizer 120 can be, for example, a stab jack stabilizer.

It will also be understood by those skilled in the art that alternative locations for the stabilizers 120 can be chosen for attachment to the frame 12 in order to support the load of the pivoted depository 34, e.g., attachment to the frame 12 roughly under the transverse centerline of each of the right and left side hoppers 72, 94 respectively.

The conveyor belt 38 rolls across the surface of a series of idlers 36, 54 which may be troughed so that the conveyor belt 38 has a pocket-like depression in the center of the conveyor belt 38 to increase conveying capacity and to decrease spillage of the overburden from the belt 38. At the discharge point where the side hoppers 72, 94 feed the center hopper 80 the troughed idlers are preferably impact idlers 36, used to protect the conveyor belt 38 and to absorb some of the inherent shock of the overburden landing on the belt 38.

The right and left side hoppers 172, 94 are pivotally attached to pivot about an axis running generally along the line of abutment 76, 98 of the each side hopper floor 74, 96 and the respective side walls 78, 100 of the center hopper 80. The floors 74, 96 of each of the side hoppers 72, 94 have support beams 128 underlying them which may be connected to an extensible arm 130 of a hydraulic cylinder 132 which is in turn connected to the frame 12, for example, by a bracket 134. Pivotal connections 136 are shown in FIG. 4 and preferably used to connect the extensible arm 130 and the hydraulic cylinder 132, but non-pivotal connections could be used. It will be understood that these connections 136 could be reversed. It will further be understood that other possible arrangements of the attachment of the hydraulic cylinder 132 to the frame could be selected by one skilled in the art, e.g., attaching the hydraulic cylinders 132 to a portion of frame 12 underlying respectively the right and left side hoppers 72, 94 by trunnion pivots.

In the normal position the tops of the side hoppers 72, 94, as they are shown in FIG. 4 with the grizzley bar arrangement 110 thereon slant outwardly and downwardly so that the larger pieces of overburden material will tend naturally to roll off of the hopper grizzley bars 112. The floors 74, 96 of each of side hopper 72, 94 in this position are generally horizontal. However, the side hoppers 72, 94 may be rotated about their pivots 76, 98 by extending the respective hydraulic arms 130 in order to further facilitate the distribution of the overburden into the center hopper 80 and onto the conveyor 38.

In the preferred embodiment the top 138 of the outboard sides or side walls 140, 141 of the right and left side hoppers 72, 94 are approximately 10 to 11 feet off the ground. This leaves sufficent clearance for the bucket of a typical front-end loader having a bucket capacity of approximately 10 cubic yards such as are currently in use. Of course, side hopper 72, 94 size could be modified for use with larger front-end loaders.

Figure 5:
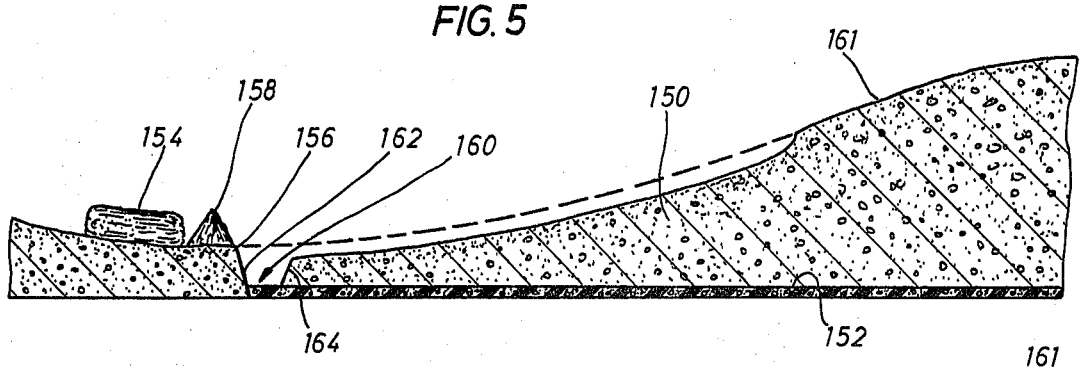
FIGS. 5, 5A and 5B show the prior art method of strip mining and the pattern of overburden spoil piles left after the overburden is removed.
Figure 5A:
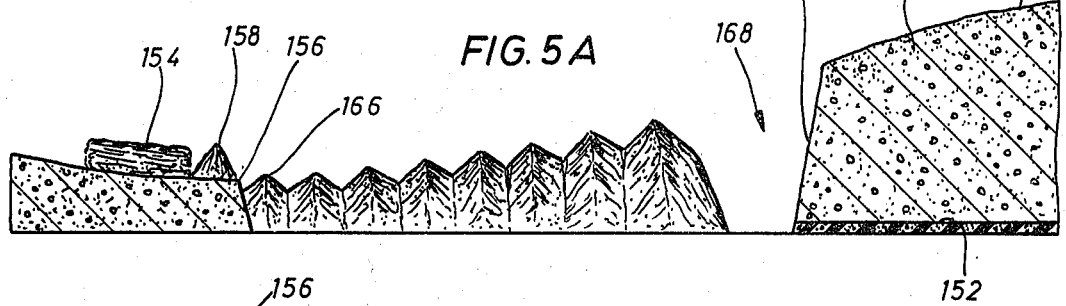
Figure 5B:
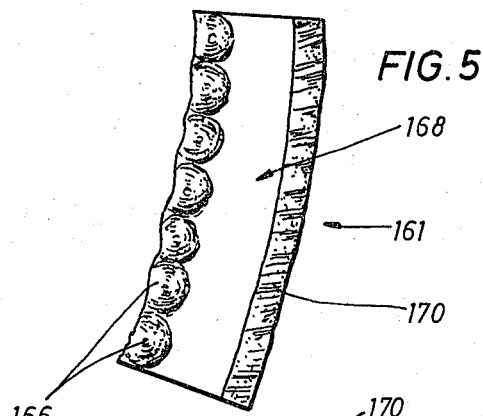

The prior art methods of strip mining can be better understood by reference to FIGS. 5, 5A and 5B. When overburden 150 lies in increasing depths over a coal seam 152 as shown in FIG. 5, typically strip mining operations remove the top soil as indicated by the dotted line in FIG. 5 and deposit it in a pile 154 roughly adjacent the place 156 where the coal seam 152 is closest to the surface, leaving room for a spoil pile 158 of removed overburden 150 which is removed to uncover the coal seam 152. This removal of the overburden 150 forms a pit 160 having a rear wall 162 and a front wall 164 and extending into the paper in FIGS. 5 and 5A. This pit 160 runs along a topographical line of minimum overburden depth and is the most economically and quickly mined pit, using current machinery, thus giving the most immediate and least expensive coal production in order to generate funds for continued mining.

After the coal seam 152, which has been uncovered, is removed from pit 160, further overburden 150 is removed and deposited in the pit 160 forming a spoil pile 166 in the previously mined pit 160. Thus a new pit (not shown) is formed having a rear wall composed of the spoil pile 166 and a front wall formed by the as yet unremoved overburden 150. The pits are successively formed, mined and filled with overburden in a direction towards increasing depth of the overburden, i.e., from left to right in FIGS. 5, 5A and 5B.

With the presently used mechanisms for transferring overburden 150 to the spoil pile 166, the spoil pile is actually formed as a plurality of piles 166 running along the previously mined pit as shown in FIG. 5B and having a cross section as shown in FIG. 5A. Two significant problems result from this mining technique according to the prior art.

First, the plurality of piles forming the spoil pile 166, as it is extended from minimum overburden depth to maximum overburden depth, must be leveled and graded, after which the topsoil 154 is replaced by bulldozing from the topsoil pile 154 across the mined area, or by hauling with scrapers or trucks, in order to comply with state and federal regulations. This adds significantly to the total cost of mining the coal seam 152 above and beyond the cost per ton of coal incurred in uncovering the coal seam 152 for mining. Second, as the pits 160 progress towards the point where removal of the overburden itself becomes economically unfeasible, in terms of cost per ton of coal which can be mined after the overburden is removed, successively deeper pits 160 are formed until the last and deepest pit 168 is left after the coal seam 152 is removed from this last pit 168. This last pit 168 is bordered by the spoil pile 166 and a front wall 170 of unremoved overburden. As can be seen in FIGS. 5A and 5B, this leaves a considerable pit 168 to be filled in order to grade the landscape to reach essentially to the top of the front wall 170 of this last pit 168, as required by state and federal regulations.

Previous practice was to partially fill and grade this pit 168 and leave a depression which would leave a gaping pit in the land having cliff formed by wall 170 or which might eventually form an unwanted man made lake filled with stagnant water from natural runoff into the depression left by partially filling the last pit 168. This practice has come under increasingly critical scrutiny and regulation by both state and federal governments and mine operators are now required to fill and grade this last pit 168. This is only accomplished, according to the prior art methods of strip mining, by a considerable expenditure in time, labor and energy in transporting great masses of overburden from all parts of the spoil piles 166 and 158 in order to fill the last formed pit 168 and meet the federal and state requirements as to grading of the mined area.

Figure 6:
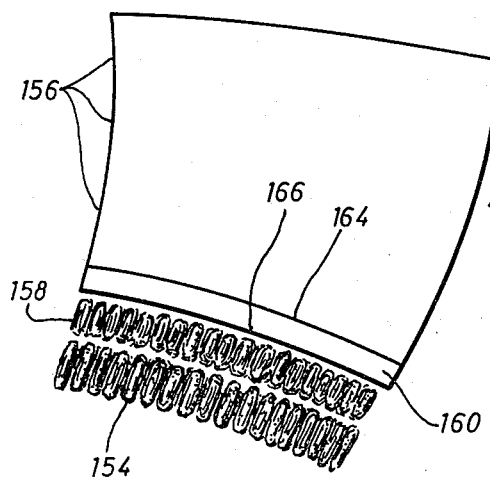
FIGS. 6 and 6A are schematic views of a typical strip mining operation, demonstrating the use of a preferred method of the present invention in a mining area roughly equivalent to that depicted in FIGS. 5, 5A and 5B.
Figure 6A:
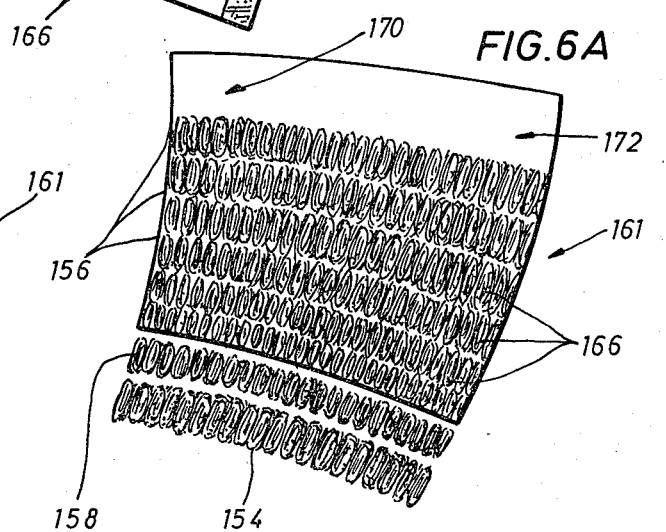

Using the method and apparatus of the present invention for the first time allows for an economically feasible removal of overburden with an initial pit in a direction generally perpendicular to that shown in FIGS. 5, 5A and 5B, i.e., into the hillside 161 with the pit walls 162, 164 of the initial pit 160 varying in height according to the general slope of the terrain, as shown in FIG. 6. Thus after these pits 160 are successively mined and refilled with overburden 150 from succeeding pits 160, the final pit 168, as shown in FIG. 6A varies in depth from one end to the other having a shallow end 170 where the overburden 150 has a relatively thin layer over coal seam 152 and a deep end 172 where the final pit 168 is extended the farthest into the hillside 161. The depth of the pit 168 at the shallow end 170 corresponds roughly to the depth of the first pit 160 as shown in FIG. 5 and the depth of the last pit 168 at the deep end 172 corresponds roughly to the depth of the last pit 168 as shown in FIG. 5A. Thus much less dirt must be relocated to refill this last pit 168 in FIG. 6A. This significantly decreases the cost of refilling and regrading the mined area.

In addition, by using the method and apparatus of the present invention the overburden 150 can be distributed on the spoil pile 166 being formed in each previously mined pit 160 in a manner which is highly controlled. The spoil piles 166 can be made essentially uniform at any selected depth in order to essentially conform to the contour of the landscape and eliminate almost all need to regrade the spoil piles 166 after mining. Use of the apparatus and method of the present invention eliminates the pattern of peaks on the spoil piles 166 shown in FIGS. 5A and 5B, which peaks must be graded after production of the coal is completed. This is so regardless of whether the pits 160 are dug as shown in FIG. 5 or generally perpendicular to those shown in FIG. 5, as is now economically feasible with the method and apparatus of the present invention and as is shown in FIGS. 6 and 6A.

Because the use of the method and apparatus of the present invention decreases the cost of transferring overburden to the spoil pile 166 in uncovering the coal seam 152 for mining and decreases the cost of post mining refilling and regrading, it will now be economically feasible to extend the pits 160 further into the hillside 161 than was before possible. In other words, the above noted cost savings counterbalance the costs of removing overburden 150 in depths greater than previously feasible overburden depth to coal seam thickness ratios. Total coal production in a given mining area will therefore be increased, increasing the reserves available for mining by strip mining techniques.

The strip mining method of the present invention can be more fully understood by reference to FIGS. 7 and 8. Typically, strip mining operations are carried out by removal of the overburden 150 from a coal seam 152 and then removing the coal seam 152 down to a layer 174 of fire clay or other floor material. As the overburden 150 is removed from the coal seam 152, it is deposited on the fire clay 174 in the previously mined pit 160 defined by a front wall or advancing wall 164 of unremoved overburden and a back wall 162, which in the case of all but the first formed of the pits 160 will be formed by the previous spoil pile 166. Thus as the overburden 150 is removed from the coal seam 152, it is ideally placed in the previous pit 160 as an extension of a previously developed spoil pile 166.

Typically as the overburden 150 is removed from above the coal seam 152 the spoil pile 166 is extended across the previous pit 160 immediately adjacent to the portion of the coal seam 152 being uncovered until an extension 176 of the spoil pile 166 reaches the border of the exposed coal seam 152, leaving this extension 176 with an upper leading edge 182 and a lower leading edge 184.

The coal seam 152 may either then be mined or further overburden 150 may be removed to expose a greater part of coal seam 152, until an entire new pit 160 is formed, prior to commencing production of the coal seam 152. In this way, the spoil pile 166 is extended across to the border of the coal seam 152 in successive sections, thus uncovering the coal seam 152 at the same time the spoil pile 166 is extended across the previous pit 160. When the thusly exposed coal 152 is mined a new pit 160 (not shown) has been formed having a fire clay 174 base across which the spoil pile can then be extended in uncovering a further portion of the coal seam 152.

Prior art methods of extending the spoil pile 166 across the previous pit 160 consumed excessive amounts of both time and energy. In the case of using drag lines or shovels the drag line or shovel must be lifted to the height of the spoil pile 166 where the overburden is to be dumped and swung to the spoil pile 166 where dumping occurs and then swung back to the overburden 150 in order to pick up a succeeding load of overburden 150. Other prior art methods in which loaders have been used to transport the overburden 150 to the spoil pile 166 involve the expenditure of time and energy in transporting the overburden 150 on the loader from the area where it is removed to the top of the extension 176 of the spoil pile 166, where it is dumped.

With the apparatus and method of the present invention, it is possible to position the mobile conveyor 11 in a suitable position roughly adjacent to the point where the overburden 150 is being removed. Front end loaders or other loading machines can then be used to dump overburden 150 into the side hoppers 72, 94 of the present invention. Dumping the overburden 150 into a stationary hopper 72, 94 and transferring the overburden 150 to the spoil pile 166 on a conveyor 38 is both quicker and less expensive than prior art methods of removing the overburden 150 and depositing it on the spoil pile 166.

The present apparatus has the capacity to pivot or articulate the discharge end 66 from side-to-side about a fixed vertical axis, which is substantially the vertical center axis of the tracked propulsion mechanism 14. This is in conjunction with the capacity to raise and lower the discharge end 66 of the conveyor 38 upwardly and downwardly and the precise control of the movement of the discharge end 66 of the conveyor 38 as raising or lowering occurs, due to the four bar linkage connection of the conveyor boom 26, to the frame 12. These capabilities provide for a highly flexible and accurate distribution of the overburden 150 onto the spoil pile 166 as the spoil pile 166 is added to in order to form the extension 176 across the previously mined pit 160. Further by movement of the tracked propulsion unit 14, it is possible to continuously control the translation of the distal end 66 of the conveyor by translating the entire apparatus 11 about the surface on which the tracked propulsion unit 14 is traveling.

Thus, the spoil pile 166 can be built up very evenly at selected heights. The even distribution continues as the mobile conveyor system is periodically moved on the newly uncovered coal seam 152, as the overburden 150 is removed from the coal seam 152, until finally the extension of the spoil pile and the uncovered portion of the coal seam 152 will appear as shown in FIGS. 7 and 8. The apparatus of the present invention can then be moved to a point substantially adjacent to the point where the unremoved overburden 150 substantially abuts the upper righthand corner of the extension 176 of the spoil pile 166 as shown by the location of the mobile conveyor in FIG. 7. The same procedure can then be followed to remove further overburden 150 from above succeeding portions of the coal seam 152 in the direction from the bottom to the top of FIG. 7, thus forming a new pit 160 once the coal 152 is removed.

More specifically, an embodiment of the apparatus of the present invention has an overall length, from the projection of the distal end 66 onto the ground, when the conveyor is raised to its full elevation of approximately 52'6" above the ground, to roughly the lateral centerline of the pivotal depository 34, of about 133 feet. In a typical pit 160 shown in FIG. 7 the back wall 162 formed by the spoil pile 166 will have a natural angle of repose of from about 35° to 45°. Thus in extending the spoil pile 166 across the fire clay 174 of the previously formed pit 160, the method of the present invention would be to position the apparatus of the present invention on the fire clay 174 with its depository 34 end closest to the front wall 164 of the previously mined pit 160, formed by the overburden 150 bank, and the distal end 66 of the conveyor 26 roughly over the upper leading edge 178 of the spoil pile 166.

Slowly pivoting the distal end of the conveyor 66 back and forth about the vertical axis through the propulsion unit 14 circumscribing angles of about 10° to 15° either side of the position in which the conveyor is shown in FIG. 7, as shown by the dotted lines, will result in a very even distribution of the removed overburden 150 on the spoil pile 166. As the overburden bank 164 is excavated exposing the coal seam 152 the tracked propulsion unit 14 can be used to move the mobile conveyor of the present invention towards or onto the exposed coal seam 152 and generally perpendicularly away from lower leading edge 180 of the spoil pile 166 which had been formed in excavating the previous pit 160. Continued pivoting of the conveyor distal end 66 about the vertical axis through the propulsion unit 14 will insure continued even distribution of the overburden 150 on a second extension (not shown) of the spoil pile 166 which will be formed, like extension 176, as the mobile conveyor 11 retreats in a direction from left to right in FIG. 7.

Thus a further part of the coal seam 152 will be exposed in the same manner as shown at the bottom of FIGS. 7 and 8 and a further extension (not shown) of the spoil pile will be created. Ideally, the coal seam will be uncovered for a distance equal to approximately the overall length of the mobile conveyor 11, or between about 133 and 135 feet according to one preferred embodiment, depending on the elevation of the distal end 66 of the conveyor. As shown in the cross sectional view of FIG. 8 the extended spoil pile 176 will have its natural angle of repose from a top leading edge 182 to a bottom leading edge 184 which will be generally adjacent the newly uncovered coal seam 152.

Another variation of the method depicted in FIGS. 7 and 8 would be to place the apparatus of the present invention in the pit 160, as before, with its distal end 66 essentially above the upper leading edge 178 of the spoil pile 166. However instead of retreating from left to right as shown in FIGS. 7 and 8, the device can be moved roughly parallel to the overburden bank 164 being excavated while, once again, pivoting the distal end 66 of the mobile conveyor 11 back and forth for even distribution of the removed overburden 150 on the spoil pile 166 while a portion of overburden bank 164 is being removed for the whole length of the pit 160. The apparatus of the present invention may then be retreated a distance equal approximately to the width of the portion of overburden bank 164 removed in traversing the length of the pit 160. The overburden 150 is further removed and by use of the mobile conveyor transported to the spoil pile 166 as the mobile conveyor retraverses the length of the pit 160, either in the same or the opposite direction as that of the first traverse.

Once the operator of the apparatus of the present invention becomes skilled in its use, the capabilities of the apparatus will enable the operator, through pivoting and raising or lowering the distal end 66 of the conveyor 38, to extend the spoil pile 166 across the pit 160 in a very even manner thus eliminating almost all need to regrade the spoil pile 166 area. Some minimal regrading will perhaps be needed because, even with the versatility of the apparatus of the present invention, perfectly even distribution of the overburden 150 on the spoil pile 166 may not be possible.

Figure 9:
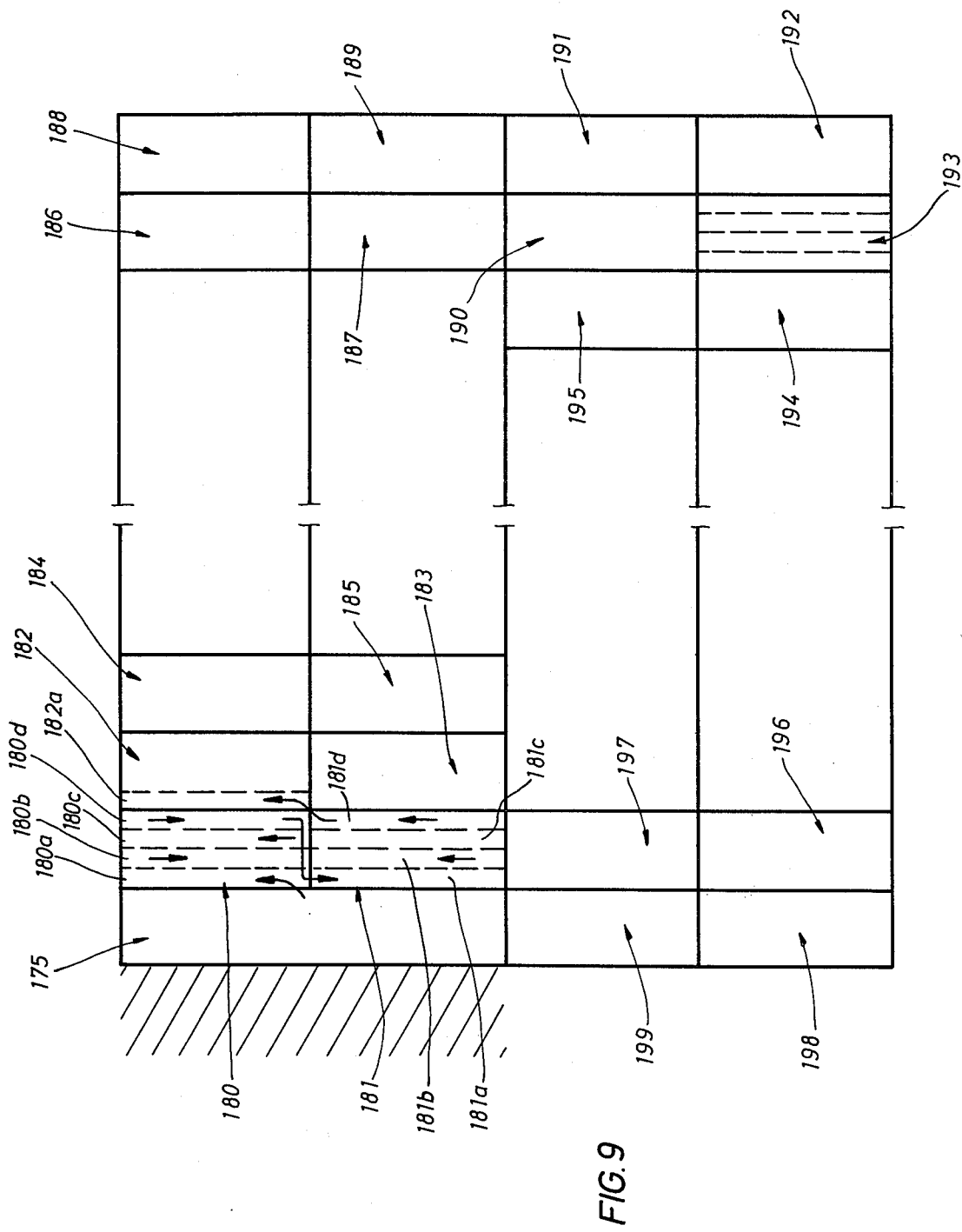
FIG. 9 is a schematic representation of a method of mining according to the present invention.

A further application of the mobile conveyor 11 according to the present invention in a method for strip mining is shown in FIG. 9. FIG. 9 shows the further mining method in schematic form for simplicity of illustration. In the schematic, sections of overburden which are to be removed from the top of a coal seam are shown as rectangular blocks, though it will be understood that in actual application these sections need not be precisely rectangular.

According to the method illustrated in FIG. 9 the first pit 175 is excavated from the top of the coal seam using the apparatus of the present invention to deposit the overburden on the bank of the pit to one side as shown by cross hatching to the left of the first pit 175. Using the apparatus and method of the present invention as described above a first cut is made in the opposite bank of the pit 175. This first cut is designated as 180a and can be made in the direction of the arrow shown in the small rectangle designated 180a. This cut can preferably have a width, measured from left to right in FIG. 9, of about 10 feet. Using the apparatus and method of the present invention as described above, the overburden removed from cut 180a can be deposited in pit 175 directly opposite from the cut and adjacent the wall of the pit 175 adjacent to the bank where the overburden removed from pit 175 had been placed. A second cut designated 180b can then be made in the direction shown by the arrow in the small rectangle designated 180b with the overburden thus removed also deposited in pit 175 adjacent to that overburden removed during cut 180a. A third cut 180c can then be made in the direction of the arrow shown in the small rectangle designated 180c with the overburden thus removed being again deposited in pit 175 adjacent to the overburden removed in cut 180b. Finally a fourth cut can be made designated 180d in the direction of the arrow shown in the small rectangle designated 180d, again depositing the overburden thus removed in pit 175.

Thus, after the four cuts have been made a new pit 180 will have been formed with the overburden removed from that pit deposited in that portion of pit 175 adjacent to the newly formed pit 180. The overburden removed by the four cuts 180a, 180b, 180c and 180d will have formed a spoil pile in a portion of pit 175 having a generally even upper surface because of the manner of depositing the overburden on this newly formed spoil pile as described above. The apparatus of the present invention can then be moved in the direction shown by the arrow from cut 180d to the small rectangle designated as 181*a* in order to make the first cut in section 181. As described above with respect to section 180, four cuts of approximately 10 feet in width, 181*a,* 181*b,* 181*c* and 181*d* can be made with the overburden thus removed being deposited in the portion of pit 175 directly adjacent to section 181 in the same manner as was described above with respect to section 180.

After the coal has been removed from section 181, the apparatus of the present invention can then be moved in the direction of the arrow shown from cut 181*d* to the small rectangle designated 182*a* in order to make the first cut 182*a* in section 182. In the same manner as described above with respect to sections 180 and 181 four cuts can be made in section 182 depositing the overburden thus removed in the pit formed by the removal of overburden from section 180.

Similarly, the overburden can then be removed from section 183 depositing the removed overburden in section 181. Then in like manner the overburden can be removed from section 184 depositing it in section 182 and from section 185 depositing it in section 183.

This procedure is followed until the overburden has been removed from sections 186 and 187 and deposited in the previously formed pits directly adjacent to each of pits 186 and 187 (which previously formed pits are not shown in FIG. 9) as described above.

Further, as described above, the overburden can be removed from section 188 and deposited in section 186.

Because of the capability of the mobile conveyor 11 of the present invention to pivot about its tracked propulsion unit, the overburden can then be removed from section 189 in like manner as described above by making four cuts through section 189 as shown in sections 180 and 181 with the conveyor boom 26, 52 being positioned to deposit the material in section 188. Alternatively, a series of cuts generally perpendicular to those shown in sections 180 and 181 can be made over the area designated by section 189, again with the mobile conveyor 11 having the boom 26, 52 positioned to deposit the material in section 188. This will leave two adjacent pits 187 and 189 uncovered.

In like manner as described above with respect to section 189, the overburden can then be removed from sections 190 and 191 with the overburden removed from those sections being deposited respectively in sections 187 and 189. Also in like manner as described above with respect to section 189, the overburden can be removed from section 192 and deposited in section 191. As described above with respect to sections 180 and 181, the overburden can then be removed from section 193 and placed in section 192. The four cuts made in removing overburden from section 193 are made in a direction from right to left in FIG. 9 as shown by the dotted lines. This will leave sections 190 and 193 open and allow for the procedure described above with respect to, e.g., sections 180 and 181 to be used to progress from right to left across the bottom of FIG. 9. Thus, sections 194 and 195 can then be excavated depositing the overburden removed therefrom respectively in sections 193 and 190 and the procedure continued until sections 198 and 199 are excavated with the overburden removed therefrom being deposited respectively in sections 196 and 197.

This will leave a pit in sections 198 and 199, and, as can be seen from the schematic of FIG. 9 it will be relatively simple matter to move the overburden remaining from the excavation of pit 175, as shown by the cross hatching on FIG. 9, in order to fill the pit left by the excavation of sections 198 and 199.

As can be readily understood this process comprises the removal of overburden in alternating removal sections along one mining direction from left to right across the top of FIG. 9. The overburden removed from each section is deposited into an adjacent previously mined section, which is adjacent to the respective sections from which overburden is removed and on the side of each such removed section opposite from the one mining direction. After proceeding for a desired distance, the overburden is removed from a final section 189 and deposited in the section 188 adjacent to that final section 189, which section 188 is adjacent to the final section 189 in a direction perpendicular to the first mining direction. This leaves open the final section 189 and the section 187 adjacent to the final section 189 in the direction opposite to the first mining direction. Then, these two open sections 187, 189 are filled with the overburden from the sections 190, 191 laterally adjacent to these two sections 187, 189 in a direction perpendicular to the first mining direction and opposite from the section 188 into which the overburden from the final section 189 was deposited. The overburden is then removed from a corner section 192 laterally adjacent to the section 191, which in turn was laterally adjacent the final section 189, and on the opposite side from final section 189 and deposited in the section 191 laterally adjacent the final section 189. The overburden is then removed from a section 193 adjacent to this corner section 192 in a direction opposite from the first mining direction and deposited in this corner section 192. Thereafter the overburden is removed from alternating sections in a second mining direction opposite from the first mining direction and deposited in previously mined sections adjacent to the sections from which overburden has been removed, which previously mined sections are adjacent on a side opposite from the second mining direction. The process continues in the second mining direction until overburden is deposited into the sections 196 and 197 adjacent the first two sections 180, 181 from which overburden had been removed, which sections 196 and 197 are adjacent to the first two sections 180, 181 in a direction generally perpendicular to the first and second mining directions. Two terminal sections 198, 199 are thereby left uncovered adjacent to the sections 196, 197 in which overburden is deposited and which are adjacent those sections 196, 197 in the second mining direction. Thereafter those terminal sections 198, 199 are filled with the overburden from the initial pit 175. This process serves to greatly facilitate the essential elimination of most of the necessary regrading and refilling in order to comply with state and federal regulations, by requiring only that the overburden represented by the cross hatching on FIG. 9 be transported into the last two pits 198 and 199, and through use of the apparatus of the present invention for evenly distributing overburden on the spoil piles.

SUMMARY OF ADVANTAGES AND SCOPE OF THE INVENTION

It will be appreciated that in constructing a mobile material transfer system and use of the method of the present invention, significant advantages are provided.

In particular:

The apparatus and method of the present invention results in improving the capacity and versatility of prior art methods and apparatus for removing and transporting overburden to the spoil pile.

The apparatus and method of the present invention, further, result in adding the capability of controlled distribution, which enables depositing of the overburden on the spoil pile in a manner which reduces or eliminates handling of the overburden by a transporting vehicle and reworking the spoil pile for reclamation purposes.

The apparatus and method of the present invention allows for mining pits to be formed having a longitudinal axis into the hillside rather than following a topographical line along a generally constant depth of overburden, thus substantially eliminating the significant problem of filling and grading the final pit, while not delaying initial production from the first formed pit. This eliminates the past necessity that the first formed pit be dug along a line of minimum overburden depth in order to quickly generate funds from initial coal production in order to sustain continued operation of the mine.

The apparatus and method of the present invention, in addition, results in increasing the overburden removal rate with a decrease in energy expended without necessity of increasing bucket or shovel size or machine speed of the excavating machinery, by reducing the transport time, lift height, swing time and dumping time of the excavators and by reducing or eliminating transit time by the excavators or loaders from the overburden bank to the spoil pile dumping point.

The apparatus and method of the present invention also results in greatly reducing the energy expended in reworking the spoil pile.

The apparatus and method of the present invention, additionally, result in decreasing the cycle time of prior art methods and apparatus from the point in time of loading the excavated overburden to the point in time of discharging the overburden from the loader into the hoppers of the present invention, as opposed to onto the spoil pile.

Also, using the apparatus and method of the present invention results in more closely approximating a continuous excavating and transfer operation.

Further, the use of the apparatus and method of the present invention results in decreasing the energy expended in prior art methods and apparatus for depositing the overburden on the spoil pile by eliminating, in the case of prior art shovels and draglines, the energy expended in continuously swinging their booms from the overburden site to the spoil pile and in lifting the shovel or dragline bucket contents to above the spoil pile (a major part of the energy expended in prior art shovel and dragline methods of overburden removal and transfer), or, in the case of vehicular transport, the continual movement of the vehicle from the loading point to the top of the spoil pile.

In addition, the use of the apparatus and method of the present invention results in reducing the production of dust encountered in the prior art use of shovels or draglines to deposit the overburden by dumping it on the spoil pile.

Moreover, using the apparatus and method of the present invention results in the ability to use relatively small front-end loaders alone for excavating the overburden and dumping it into the pivoted depository of the present invention which has the advantage of using these smaller, energy efficient, more mobile and faster excavating devices to maximum utility.

The foregoing description of the invention has been directed to a particular preferred embodiment in accordance with the requirements of the Patent Statutes and for purposes of explanation and illustration. It will be apparent, however, to those skilled in this art that many modifications and changes in both the apparatus and method may be made without departing from the scope and spirit of the invention.

For example, the apparatus of the present invention may have other applications in material transport operations, apart from the strip mining method herein described, either in strip mining or other material transfer arts. Also the tracked propulsion mechanism might be replaced by one having wheels. In addition, the essentials of the present method may be employed in other than strip mining.

It will be further apparent that the invention may also be utilized, with suitable modifications within the state of the art. Examples of such known techniques include modifications to the grizzly arrangement to provide for dumping of unwanted larger pieces of overburden by, e.g., tilting of the grizzly independent of the side hopper. Also the fixed axis about which the frame pivots may be other than substantially through the vertical center axis of the propulsion mechanism.

In addition, the pivoted depository could be enlarged to make it more suitable for use with front-end loaders larger than the 10 cubic yard bucket size, or could contain only one side hopper.

Further, rather than having a separate fixed section of the conveyor assembly extending under the pivoted depository, the boom might be pivotally mounted such that the boom itself extends under the pivoted depository. The idlers on the lower end of the boom could then by impact idlers as are presently described to be on the fixed portion of the conveyor assembly.

These and other modifications of the invention will be apparent to those skilled in the art. It is applicant's intention in the following claims to cover all such equivalent modifications and variations as fall within the true spirit and scope of the invention.

What is claimed is:

1. An apparatus for transferring material, e.g. overburden, comprising:
   lower support means;
   a frame rotatably mounted to said support means about a vertical axis;
   means defining a hopper supported by said frame and having at least a portion thereof in horizontal spaced relation to said support means and outwardly from said vertical axis;
   a conveyor mounted to said frame and extending to a discharge end, said conveyor communicating with said hopper for receiving material therefrom and conveying the material to the conveyor discharge end, at least a portion of said conveyor being mounted for pivoting about a horizontal axis on said frame that is spaced apart from said vertical axis and is located between said vertical axis and the end of said conveyor which communicates with said hopper; and
   means for pivoting said conveyor portion about said horizontal axis to adjust the elevation of the conveyor discharge end;
   whereby, in operation, the horizontally displaced hopper portion facilitates the maintenance of the apparatus center of gravity within the area defined by said support means.

2. An apparatus as claimed in claim 1 wherein said conveyor includes a portion fixed with respect to said hopper and communicating therewith.

3. An apparatus for transferring material, e.g. overburden, comprising:
lower support means;
a frame rotatably mounted to said support means about a vertical axis;
means defining a hopper supported by said frame and having at least a portion thereof in horizontal spaced relation to said support means and outwardly from said vertical axis; and
a conveyor mounted to said frame and extending to a discharge end, said conveyor communicating with said hopper for receiving material therefrom and conveying the material to the conveyor discharge end, at least a portion of said conveyor being mounted for pivoting about a horizontal axis that is located between said vertical axis and said hopper portion;
means for pivoting said conveyor portion about said horizontal axis to adjust the elevation of the conveyor discharge end;
whereby, in operation, the horizontally displaced hopper portion facilitates the maintenance of the apparatus center of gravity within the area defined by said support means.

4. An apparatus as claimed in claim 1 wherein said conveyor portion is supported by a boom.

5. An apparatus as claimed in claim 4 wherein said means for pivoting comprises an extendible and retractable boom support member connected at its ends to said frame unit and an intermediate portion of said boom, respectively.

6. An apparatus as claimed in claim 5 wherein said boom support member comprises a fluid cylinder connected to both the boom and the frame by pivot connections to provide a fourbar linkage.

7. An apparatus as claimed in claim 4 wherein said boom includes upper and lower boom rods connected by lattice work to define a self-supporting truss.

8. An apparatus as claimed in claim 7 wherein said boom includes a first bottom portion and an extension portion, the lower boom rods in the bottom portion being non-parallel to the upper boom rods and having their maximum distance from said upper boom rods at substantially the point where said boom support member engages the boom, said boom extension portion having the upper and lower boom rods substantially parallel.

9. An apparatus as claimed in claim 1 wherein said support means comprises track means.

10. An apparatus as claimed in claim 9 wherein said vertical axis is substantially coincident with the rotational center of said track means.

11. An apparatus as claimed in claim 1 wherein said conveyor means comprises at least one endless belt.

12. An apparatus as claimed in claim 1 wherein said hopper includes material sizing grizzly bars.

13. An apparatus as claimed in claim 1 having a shock absorbing stabilizer positioned below said hopper.

14. An apparatus as claimed in claim 1 including a hydraulic power supply.

15. An apparatus as claimed in claim 1 wherein the top of the hopper is on the order of 10-11 feet off the ground and is thereby adapted to receive material from a front end loader.

16. An apparatus as claimed in claim 1 wherein said frame is elongate and wherein the frame is mounted to the support means at substantially one end of the frame and the frame supports the hopper at substantially the opposite end of the frame.

17. An apparatus as claimed in claim 1 wherein said hopper comprises:
right and left side hopper portions;
a center hopper portion operably positioned with respect to said right and left side hopper portions;
said right and left side hopper portions being pivotable about respective axes to transfer material from said right and left side hopper portions into said center hopper portion; and
means for pivoting said right and left side hopper portions.

18. An apparatus as claimed in claim 1 wherein said depository comprises:
a side hopper portion defined by a floor, a side hopper front wall, a side hopper rear wall and a side hopper side wall, defining an open top and an open side wall;
a center hopper portion operably positioned with respect to said side hopper portion, said center hopper portion being defined by a center hopper left side wall and a center hopper rear wall, and having a discharge opening operable to discharge material in said center hopper portion onto said conveyor belt;
said side hopper portion being pivotally attached with respect to said center hopper portion so that material deposited into said side hopper portion is transferable into said center hopper portion;
said center hopper portion having, disposed on said center hopper right side wall and said center hopper left side walls, a plurality of vanes for directing the material discharged into said center hopper portion onto said conveyor; and,
pivoting means for pivoting said side hopper portion.

19. An apparatus as claimed in claim 1 wherein said hopper comprises:
a right side hopper portion and a left side hopper portion each being defined by a floor, a side hopper front wall, a side hopper rear wall and a side hopper side wall, defining an open top and an open side wall;
a center hopper portion operably positioned with respect to said side hopper portions, said center hopper portion being defined by a center hopper right side wall and a center hopper left side wall and a center hopper rear wall, and having a discharge opening operable to discharge material in said center hopper portion onto said conveyor;
said right side hopper portion and said left side hopper portions being pivotally attached with respect to said center hopper portion so that material deposited into said right side hopper portion and said left side hopper portion is transferable into said center hopper portion;
said center hopper portion having, disposed on said center hopper right side wall and said center hopper left side wall, a plurality of vanes for directing the material discharged into said center hopper portion onto said conveyor; and,
a first pivoting means for pivoting said right side hopper portion and a second pivoting means for pivoting said left side hopper portion.

20. An apparatus as claimed in one of claims 17, 18 or 19 wherein each said hopper portion has disposed thereon a plurality of grizzly bars.

21. An apparatus as claimed in claim 3 wherein said support means comprises track means.

22. An apparatus as claimed in claim 21 wherein said vertical axis about which the frame is rotatably mounted is substantially coincident with the rotational center of said track means.

* * * * *

UNITED STATES PATENT AND TRADEMARK OFFICE
CERTIFICATE OF CORRECTION

PATENT NO.   :  4,345,680
DATED        :  August 24, 1982
INVENTOR(S)  :  Franklin J. Kay It is certified that error appears in the above-identified patent and that said Letters Patent are hereby corrected as shown below:

Column 9, line 37, "beam" should be --beams--;
Column 10, line 53, "the (first occurrence) should be --and--;
Column 11, line 18, "172" should be --72--;
Column 11, line 51, "sufficent" should be --sufficient--;
Column 13, line 3, "has" should be --was--;
Column 21, line 39, "fourbar" should be --four-bar--;
Column 21, line 61, "having" should be --including--.

Signed and Sealed this

Second Day of November 1982

[SEAL]

Attest:

GERALD J. MOSSINGHOFF

Attesting Officer    Commissioner of Patents and Trademarks